(12) United States Patent
Davidson et al.

(10) Patent No.: US 10,173,160 B2
(45) Date of Patent: Jan. 8, 2019

(54) EFFLUENT REMOVAL SYSTEM AND METHOD OF USE

(71) Applicants: Erick Arthur Davidson, Salinas, CA (US); Rudi Groppe, Gilroy, CA (US)

(72) Inventors: Erick Arthur Davidson, Salinas, CA (US); Rudi Groppe, Gilroy, CA (US)

(73) Assignee: HEINZEN, LLC, Gilory, CA (US)

( * ) Notice: Subject to any disclaimer, the term of this patent is extended or adjusted under 35 U.S.C. 154(b) by 162 days.

(21) Appl. No.: 14/968,532

(22) Filed: Dec. 14, 2015

(65) Prior Publication Data

US 2017/0100688 A1 Apr. 13, 2017

Related U.S. Application Data

(60) Provisional application No. 62/239,719, filed on Oct. 9, 2015.

(51) Int. Cl.
| | | |
|---|---|---|
| B01D 45/00 | (2006.01) | |
| B01D 45/08 | (2006.01) | |
| B01D 45/16 | (2006.01) | |
| B01D 50/00 | (2006.01) | |
| B01D 46/10 | (2006.01) | |

(52) U.S. Cl.
CPC .......... *B01D 45/08* (2013.01); *B01D 45/16* (2013.01); *B01D 46/10* (2013.01); *B01D 50/002* (2013.01); *B01D 2273/30* (2013.01)

(58) Field of Classification Search
CPC .... B01D 45/08; B01D 45/16; B01D 2273/30; B01D 46/10; B01D 50/002
See application file for complete search history.

(56) References Cited

U.S. PATENT DOCUMENTS

| | | | | |
|---|---|---|---|---|
| 2,384,891 A * | 9/1945 | Collins | ..................... | B22C 5/08 209/135 |
| 2,723,725 A * | 11/1955 | Keiffer | ................... | B01D 45/08 55/291 |
| 3,909,222 A * | 9/1975 | Caughlin | ............... | B01D 45/08 209/143 |
| 4,525,284 A * | 6/1985 | Saalasti | .................. | B01D 36/02 210/777 |
| 4,559,235 A * | 12/1985 | Miller | .................... | A23N 17/00 426/518 |
| RE33,444 E * | 11/1990 | Lerner | ................... | B01D 45/08 165/159 |
| 6,312,504 B1 * | 11/2001 | Both | ...................... | B01D 45/08 55/385.5 |
| 2002/0040643 A1* | 4/2002 | Ware | .................... | A23B 7/0205 99/467 |
| 2006/0243830 A1* | 11/2006 | Josephs | ................... | B02C 13/02 241/19 |

(Continued)

*Primary Examiner* — Dung H Bui
(74) *Attorney, Agent, or Firm* — GSS Law Group

(57) ABSTRACT

An effluent removal system comprising, a vacuum plenum to receive, at an inlet of the vacuum plenum, an effluent mixture comprising a gas and a liquid, a droplet separator having an inlet coupled to an outlet of the vacuum plenum, the droplet separator to substantially remove the liquid from the effluent mixture and a blower having an inlet coupled to a gas outlet of the droplet separator, the inlet of the blower to receive the gas of the effluent mixture after the liquid has been substantially removed from the effluent mixture by the droplet separator.

6 Claims, 2 Drawing Sheets

(56) References Cited

U.S. PATENT DOCUMENTS

| | | | |
|---|---|---|---|
| 2008/0251356 A1* | 10/2008 | Bratusa | B65G 69/181 |
| | | | 198/495 |
| 2010/0187180 A1* | 7/2010 | Baten | B01D 45/16 |
| | | | 210/718 |
| 2011/0197764 A1* | 8/2011 | Ardizzone | B01D 45/06 |
| | | | 95/272 |
| 2011/0239861 A1* | 10/2011 | Prud'homme | B01D 46/0046 |
| | | | 95/107 |
| 2011/0252968 A1* | 10/2011 | M?kinen | B01D 45/08 |
| | | | 95/267 |
| 2013/0000266 A1* | 1/2013 | Asbury | B01D 45/08 |
| | | | 55/445 |
| 2014/0165514 A1* | 6/2014 | Licht | B01D 45/06 |
| | | | 55/423 |
| 2015/0075382 A1* | 3/2015 | Kim | B01D 53/002 |
| | | | 96/136 |
| 2015/0174519 A1* | 6/2015 | Zhang | B01J 20/20 |
| | | | 95/224 |
| 2015/0296863 A1* | 10/2015 | Munger | B08B 3/022 |
| | | | 134/21 |
| 2015/0375234 A1* | 12/2015 | McClung, III | C09K 8/03 |
| | | | 241/1 |
| 2016/0245176 A1* | 8/2016 | Sheoran | F02C 7/052 |
| 2016/0303768 A1* | 10/2016 | Usui | B29B 9/065 |
| 2017/0036149 A1* | 2/2017 | Barley | B01D 45/08 |

\* cited by examiner

EFFLUENT REMOVAL SYSTEM AND METHOD OF USE

FIELD OF THE INVENTION

The present invention relates generally to effluent removal, and more particularly to a food processing vacuum dewatering system that minimizes the possibility of food contamination.

BACKGROUND OF THE INVENTION

The Food Safety Modernization Act (FSMA) of 2011 aims to ensure that the United States food supply is safe by shifting the focus from simply responding to food contamination to proactively preventing the contamination of food. As such, there is a need in the art for hygienically designed food processing equipment that produces microbiologically safe food by minimizing the risk of contamination. It is also desirable that the hygienically designed food processing equipment be easily cleaned and sanitized to further reduce the risk of contamination.

Vacuum dewatering systems are known in the art for removing water or other effluents from a product following a washing process. For example, ready-to-eat (RTE) products, which are common in the produce industry, require gross dewatering after washing and prior to packaging to limit degradation of the product and to deter the development of undesirable pathogens. Dewatering of fresh produce is typically handled through mechanical means, such as centrifuge, vibration, vacuum, etc., as opposed to heating means to preserve the freshness of the product. Processes for removing the water commonly involve vacuum dewatering, which typically involves a perforated conveyance, such as a belt or vibratory shaker mechanism and a vacuum assembly to eliminate the undesirable liquid effluent from the product.

During the washing process, produce placed on a conveyor belt is typically subjected to a liquid effluent and pressurized air. The excess liquid effluent from the washing process then passes through perforations formed in the conveyance and enters a vacuum dewatering system that utilizes a fan or blower to aspirate the effluent into the process room directly as an aerosol. Prior art attempts have been made to separate the effluent from the air after the air has exited from the fan and prior to the aspiration of the air into the process room. One prior art technique includes the dissipation of the air into a large volume chamber to slow the airflow and allow the effluent to fall out of suspension and to be collected at the bottom of the chamber. In an additional prior art technique fiber or baffle-type droplet separators are added to the vacuum dewatering system at the outlet of the fan to separate the effluent from the airstream after the airstream has passed through the fan. However, there are problems associated with the prior art techniques regarding contamination and sanitation.

RTE requires that a sterile environment be maintained during the food processing and that the processing equipment be accessible for sanitation procedures to be performed on a daily, or an even more frequent, basis. To aid in sanitation of the processing equipment, surfaces need to be accessible for regular sanitation and testing. However, the fibers used in droplet separators cannot be sanitized and the closed plenums used in the vacuum dewatering system cannot be accessed and do not provide line of sight confirmation.

The aspired effluent from the dewatering process, when not controlled, raises the humidity level in the process room, which makes dewatering more difficult. In addition, dispersing the effluent throughout the process room may also result in undesirable cross contamination of other RTE products, equipment, personnel and the process facility itself. Undesirable, unsanitary solid buildups which collect inside the dewatering equipment, plenums, ducts, fan housing and impeller when the effluent passes through the fan are not easily removed and can result in contamination of the RTE product. Additionally, an uncontrolled high pressure discharge airflow from the dewatering system can re-entrain standing liquids from surfaces such as nearby equipment, floors and personnel which may result in an undesirable aspiration of these standing liquids into the process room.

According, what is needed in the art is an improved effluent removal system and method that eliminates the undesirable aspiration of effluent into the process room and that is easy to sanitize.

SUMMARY

The invention includes an effluent removal system and method that substantially eliminates the introduction of undesirable aerosols into a food processing environment. Additionally, the effluent removal system of the present invention is easily sanitized, thereby meeting the strict requirements of the food processing industry.

In one embodiment, the effluent removal system of the present invention includes, a vacuum plenum to receive, at an inlet of the vacuum plenum, an effluent mixture comprising a gas and a liquid, a droplet separator having an inlet coupled to an outlet of the vacuum plenum, the droplet separator to substantially remove the liquid from the effluent mixture and a blower having an inlet coupled to a gas outlet of the droplet separator, the inlet of the blower to receive the gas of the effluent mixture after the liquid has been substantially removed from the effluent mixture by the droplet separator.

The liquid removed by the droplet separator may be collected and discarded, or alternatively, filtered and reused in the washing process. The aerosol free gas provided by the droplet separator may be reintroduced at an inlet to the vacuum plenum.

In the effluent removal system of the present invention, the droplet separator is removable and can be easily sanitized. Additionally, all interiors surface of the vacuum plenums, housings, fans, blowers, ducting and diffusers are accessible for frequent, scheduled, line-of-sight sanitation and testing.

In a particular embodiment, the effluent removal system is a vacuum dewatering system for use in the preparation of ready-to-eat products, such as cut produce. In this embodiment, washed produce may be placed on a perforated conveyor positioned over the vacuum plenum. An air knife may be positioned above the perforated conveyor to blow air over the washed produce to facilitate drying of the produce. In this case, the effluent mixture may be a mixture of water resulting from the washing process and air from the air knife. The effluent mixture is delivered to the vacuum plenum through the perforations of the conveyor with the aid of the air from the air knife and is delivered from the vacuum plenum to a droplet separator. The droplet separator removes the liquid from the effluent mixture and the resulting aerosol free gas is provided from the droplet separator to a blower. The air from the blower may then be reintroduced to the air knife to facilitate the subsequent drying of the produce.

Accordingly, the present invention provides an improved effluent removal system and method that eliminates the undesirable aspiration of effluent into the process room and that is easy to sanitize.

BRIEF DESCRIPTION OF THE DRAWINGS

The accompanying drawings are included to provide a further understanding of the invention, and are incorporated in and constitute a part of this specification. The drawings illustrate embodiments of the invention, and together with the description, serve to explain the principles of the invention.

DETAILED DESCRIPTION

The present invention provides an effluent removal system and method that substantially eliminates the introduction of undesirable aerosols into a food processing environment. Additionally, the effluent removal system of the present invention is easily sanitized, thereby meeting the strict requirements of the food processing industry.

Figure 1:
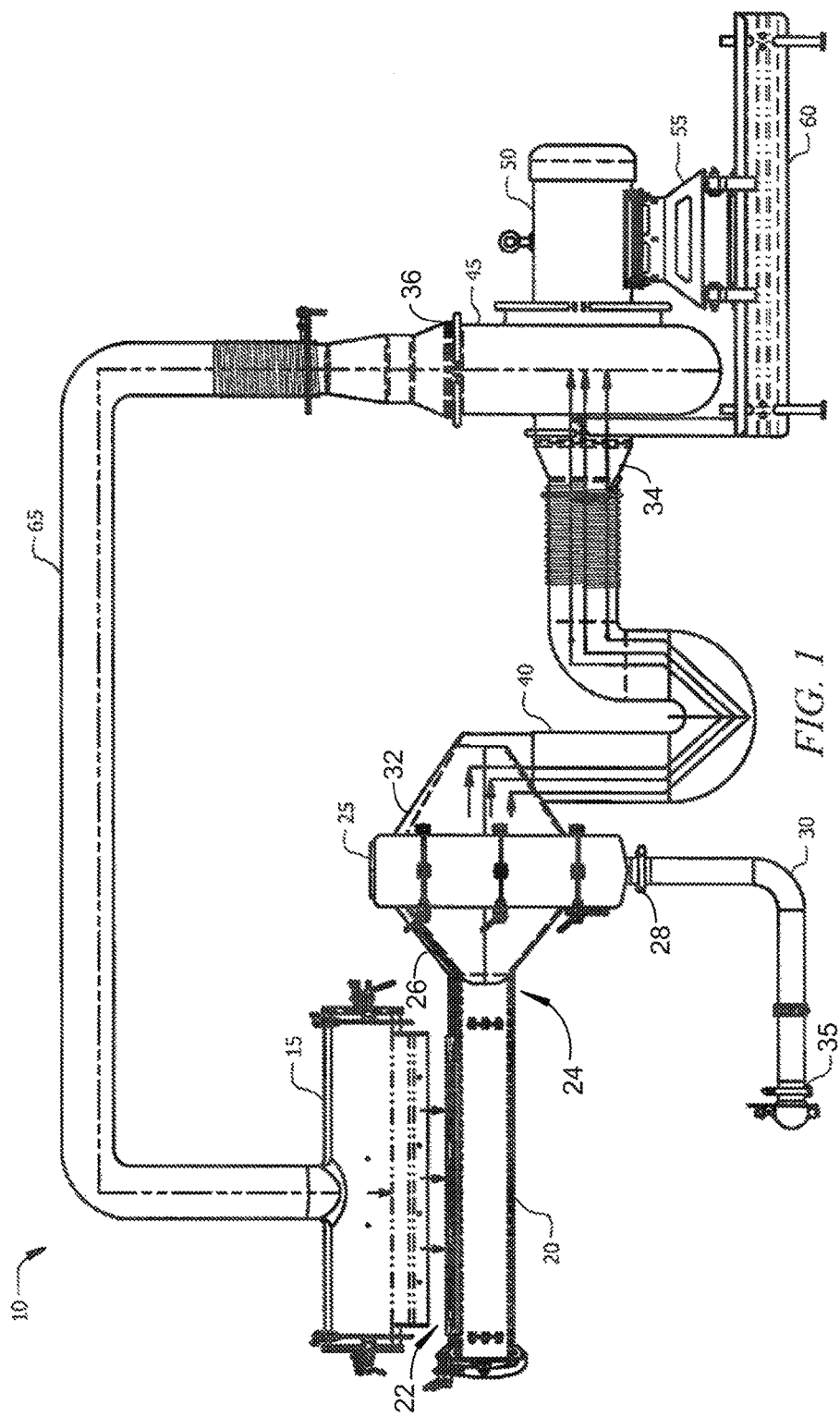
FIG. 1 is a diagrammatic view of an effluent removal system in accordance with an embodiment of the present invention.

With reference to FIG. 1, an effluent removal system 10 in accordance with an embodiment of the present invention includes, a vacuum plenum 20 to receive, at an inlet 22 of the vacuum plenum, an effluent mixture comprising a gas and a liquid, a droplet separator 25 having an inlet 26 coupled to an outlet 24 of the vacuum plenum 20, the droplet separator 25 to substantially remove the liquid from the effluent mixture and a blower 45 having an inlet 34 coupled to a gas outlet of the droplet separator 25, the inlet 34 of the blower 45 to receive the gas of the effluent mixture after the liquid has been substantially removed from the effluent mixture by the droplet separator 25.

In accordance with an exemplary embodiment, the effluent removal system 10 of the present invention may be utilized in a food processing environment. While the detailed description of the invention is directed to the use of the effluent removal system 10 in a food processing environment, this is not intended to be limiting and it is within the scope of the present invention to utilize the effluent removal system 10 in numerous environments which will benefit from the removal of a liquid from an effluent mixture prior to aspiration of the gas of the effluent mixture into the processing environment.

In the present invention, a droplet separator 25 is positioned ahead of a blower 50 in the effluent removal system 10. Droplet separators require a consistent, even, linear airflow to perform at the peak of their efficiency and avoid re-entrainment of the separated liquids. The airflow exiting a blower is turbulent air, which does not provide a consistent, even, linear airflow. Because the droplet separator 25 is positioned before the blower 50, instead of after the blower 50, the airflow entering the droplet separator 25 is smoother and slower, allowing for operation of the droplet separator 25 at peak efficiency air velocity. Additionally, removing the liquid effluent before it can contaminate the fan and other components of the blower 50 limits possible contamination of the system and the processing area. Eliminating aerosols from the blower discharge also reduces the possibility of cross contamination in the processing environment.

In an exemplary embodiment of the effluent removal system 10, the system is used as a vacuum dewatering system for a ready-to-eat (RTE) product, such as cut produce. RTE requires gross dewatering, after washing of the produce and prior to packaging, to limit degradation of the product and to deter the subsequent development of pathogens. While typically the RTE product is washed with water, other liquid effluents known in the art may also be used in the washing process. In the washing process possible contaminants are collected in the liquid effluent. Dewatering of the wet product after the washing process is typically handled by mechanical means, such as centrifuge, vibration and/or vacuum.

In a vacuum dewatering system, the washed RTE product is commonly placed on a perforated drying conveyor or vibratory shaker (not shown) that is positioned above the vacuum plenum 20. The liquid effluent passes through the perforations in the conveyance and enters the vacuum plenum 20. Vacuum plenums are known in the art for using a negative pressure gradient to draw air, or other substances, into a substantially airtight space. To aid in the drying process, an air knife 15 is typically positioned above the perforated conveyor to introduce a flow of air over the surface of the washed product. Air knives are known in the art as a tool utilizing air to blow liquid or debris from products as they travel on conveyors. As such, in this embodiment, the vacuum plenum 20 receives an effluent comprising a combination of the liquid from the washed product and a gas from the surrounding air and/or provided by the air knife 15. In one embodiment, the liquid of the effluent mixture is water and the gas of the effluent mixture is air.

After the effluent mixture has been introduced at an inlet of the vacuum plenum 20, the effluent mixture is directed to an inlet of the droplet separator 25. In a particular embodiment, the droplet separator 25 may be enclosed in a droplet separator cartridge and the droplet separator cartridge may include a plurality of droplet separators 25. Droplet separators are known in the art for removing rainwater from air incoming from an external environment and are also known to be used in chemical processing for the removal liquids from process exhaust. In one embodiment, the droplet separator 25 is a baffle-type droplet separator. In an additional embodiment, the droplet separator 25 is a sinusoidal baffle-type droplet separator.

Figure 2:
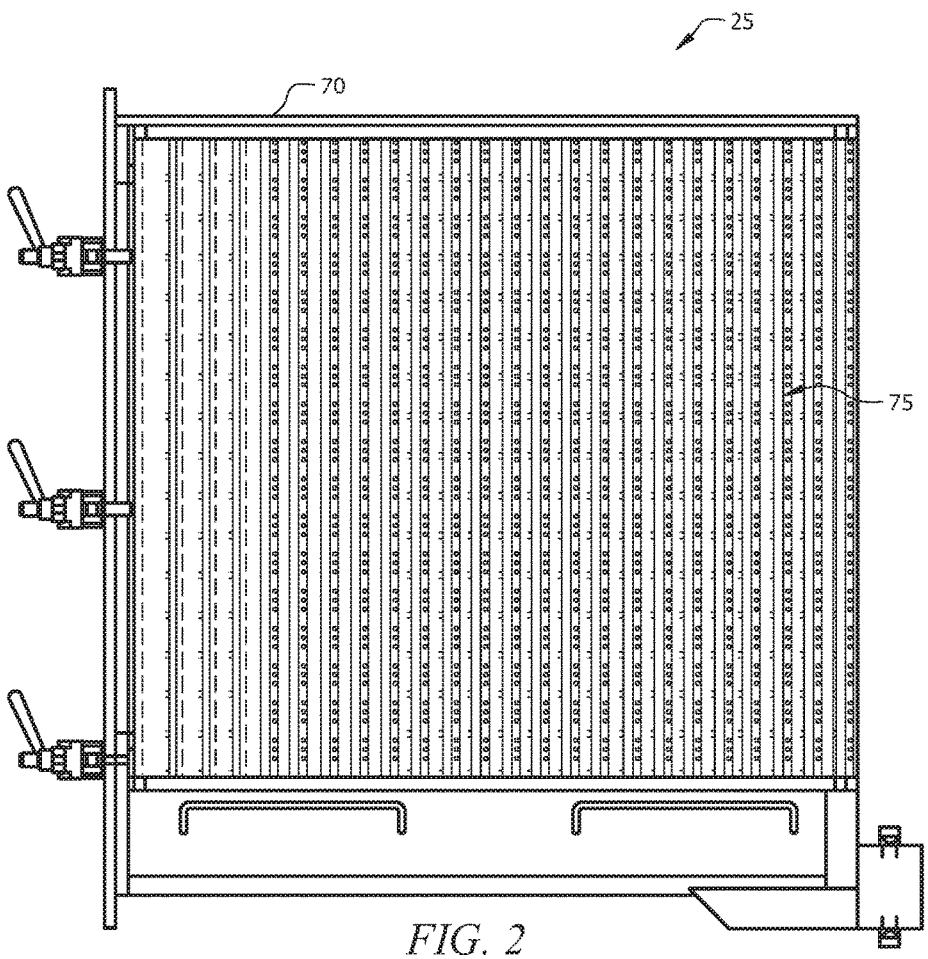
FIG. 2 is a diagrammatic view of a droplet separator in accordance with an embodiment of the present invention.

As shown with reference to FIG. 2, the droplet separator 25 may include a plurality of droplet separator components 70, wherein each droplet separator component comprises a plurality of metal plates 75. The liquid effluent introduce by the vacuum plenum 20 condenses on the metal plates 75 of the droplet separator component 70 and the run-off of the liquid is collected below the droplet separator 25. The process of condensing and collecting the liquid is effective in sufficiently removing the liquid from the effluent mixture.

The liquid that is removed from the effluent mixture by the droplet separator 25 may be provided to a liquid outlet 28 of the droplet separator 25 and collected in a drainpipe 30 coupled to the liquid outlet of the droplet separator 25. Collecting the liquid from the droplet separator 25 eliminates cross contamination. The drainpipe 30 may further include a check valve 35 at a distal end of the drainpipe. In an additional embodiment, the liquid removed from the effluent mixture may be collected and reintroduced to the washing system after passing through a filtration system.

The effluent removal system 10 further includes ducting 40 between the droplet separator 25 and the blower 45 to direct the flow of gas from an outlet 32 of the droplet separator 25 to an inlet 34 of the blower 45. Various blowers and/or fan systems are known in the art. In one embodiment, the blower 45 includes a fan, a blower housing and a blower motor 50. The blower motor 50 may be supported on a raised platform 60 by a blower motor support 55. The gas introduced at the inlet 34 of the blower 45 is substantially aerosol free, as the effluent mixture has already passed through the droplet separator 25 and the liquid has already been removed from the effluent mixture.

The effluent removal system 10 further includes ducting 65 coupled between a gas outlet. 36 of the blower 45 and the air knife 15, the ducting 65 to direct the gas from the blower 45 to the inlet 38 of the air knife 15. Diffusers can be introduced into the ducting 65 or the air knife 15 to diffuse the high-pressure discharge of the blower so that the aerosol free gas can be redirected and positioned over the conveyance. Positioning the redirected gas over the low-pressure areas of the vacuum plenum inlets increases airflow into the vacuum system and encourages evaporation, resulting in increased efficiency.

In operation of an embodiment of the present invention, the effluent removal method includes, introducing an effluent mixture comprising a gas and a liquid to an inlet of a vacuum plenum 20 and directing the effluent mixture through a droplet separator 25 to substantially remove the liquid from the effluent mixture. After the liquid has been removed, the method continues by directing the gas of the effluent mixture from a gas outlet of the droplet separator 25 to an inlet of a blower 50. A drainpipe 30 may collect the liquid captured by the droplet separator 25 and the aerosol free gas from the blower may be redirected over the vacuum plenum 20 utilizing an air knife 15.

In the effluent removal system 10 of the present invention, the droplet separator is removable and can be easily sanitized. Additionally, all interior surfaces of the vacuum plenums, housings, fans, blowers, ducting and diffusers are accessible for frequent, scheduled, line-of-sight sanitation and testing.

As such, the present invention provides an effluent removal system and method that substantially eliminates the introduction of undesirable aerosols into a food processing environment. Additionally, the effluent removal system of the present invention is easily sanitized, thereby meeting the strict requirements of the food processing industry.

Although the invention has been described with reference to particular embodiments thereof, it will be apparent to one of ordinary skill in the art that modifications to the described embodiment may be made without departing from the spirit of the invention. Accordingly, the scope of the invention will be defined by the attached claims not by the above detailed description.

What is claimed is:

1. An apparatus, comprising:

a vacuum plenum coupled to a baffle-type droplet separator, said vacuum plenum having an inlet positioned to receive a combination of a liquid and a gas, said droplet separator having an inlet coupled to an outlet of said vacuum plenum, and said droplet separator configured to remove said liquid from said gas, thereby forming a substantially aerosol free gas;

a drainpipe coupled to said droplet separator, said drainpipe positioned to receive said liquid removed from said gas;

a blower having an inlet coupled to a gas outlet of said droplet separator, said inlet of said blower positioned for receiving said aerosol free gas;

an air knife coupled to said blower, said air knife positioned above said vacuum plenum to direct said aerosol free gas downward toward said inlet of said vacuum plenum;

a ducting coupled to an outlet of said blower to direct said aerosol free gas from said blower to said air knife; and a ducting coupling said gas outlet of said droplet separator to said inlet of said blower.

2. The apparatus of claim 1, wherein said gas is air.

3. The apparatus of claim 1, wherein said liquid is water.

4. The apparatus of claim 1, wherein said droplet separator comprises a droplet separator component comprising a plurality of a metal plate configured to remove said liquid from said gas.

5. The apparatus of claim 1, wherein said droplet separator is a sinusoidal baffle-type droplet separator.

6. The apparatus of claim 1, further comprising a check valve coupled to said drainpipe.

* * * * *